(12) United States Patent
Pellegrini et al.

(10) Patent No.: US 10,336,532 B2
(45) Date of Patent: Jul. 2, 2019

(54) PACK FOR PREPARING FOOD OR BEVERAGE PRODUCTS

(71) Applicant: Nestec S. A., Vevey (CH)

(72) Inventors: Stéphane Pellegrini, Montperreux (FR); David Nordqvist, Lausanne (CH); Christian Jarisch, Lutry (CH)

(73) Assignee: Nestec S. A., Vevey (CH)

(*) Notice: Subject to any disclaimer, the term of this patent is extended or adjusted under 35 U.S.C. 154(b) by 0 days.

(21) Appl. No.: 16/063,001

(22) PCT Filed: Jan. 6, 2017

(86) PCT No.: PCT/EP2017/050247
§ 371 (c)(1),
(2) Date: Jun. 15, 2018

(87) PCT Pub. No.: WO2017/125267
PCT Pub. Date: Jul. 27, 2017

(65) Prior Publication Data
US 2019/0002194 A1   Jan. 3, 2019

(30) Foreign Application Priority Data

Jan. 18, 2016 (EP) .................................. 16151722

(51) Int. Cl.
| | |
|---|---|
| *A47J 31/36* | (2006.01) |
| *B65D 85/804* | (2006.01) |
| *B01F 3/04* | (2006.01) |
| *A47J 31/40* | (2006.01) |
| *A47J 31/44* | (2006.01) |

(52) U.S. Cl.
CPC ...... *B65D 85/8046* (2013.01); *A47J 31/3623* (2013.01); *A47J 31/407* (2013.01);
(Continued)

(58) Field of Classification Search
CPC ................ A47J 31/3623; A47J 31/3628; A47J 31/3676; A47J 31/3695; A47J 31/4492;
(Continued)

(56) References Cited

U.S. PATENT DOCUMENTS 3,628,444 A * 12/1971 Mazza ................ A47J 31/3695
99/275
8,820,218 B2 * 9/2014 Fischer .................... A47J 43/12
99/323.1
(Continued)

FOREIGN PATENT DOCUMENTS

| WO | 2011054402 A1 | 5/2011 |
|---|---|---|
| WO | 2014057098 A1 | 4/2014 |

(Continued)

OTHER PUBLICATIONS

International Search Report, dated Mar. 17, 2017, in PCT/EP2017/050247, filed Jan. 6, 2017.
(Continued)

*Primary Examiner* — Reginald Alexander
(74) *Attorney, Agent, or Firm* — Dunlap Codding, P.C.

(57) ABSTRACT

A pack for preparing a food or beverage product is disclosed, as well as methods of use thereof. The pack includes an insert comprising at least one primary fluid inlet with aqueous and gaseous fluid injection inlets, as well as a container where the ingredient or ingredients are stored, wherein the aqueous fluid injection inlet and the gaseous fluid injection inlet communicate with the inner volume of the container. Also disclosed is a machine for use with the pack in preparing a food or beverage product, a system containing the pack and the machine, and methods of use of the system containing the pack and machine.

16 Claims, 6 Drawing Sheets

(52) U.S. Cl.
CPC ........ *B01F 3/04099* (2013.01); *B65D 85/804* (2013.01); *B65D 85/8043* (2013.01); *A47J 31/3676* (2013.01); *A47J 31/4492* (2013.01); *B01F 3/04794* (2013.01)

(58) Field of Classification Search
CPC .............. B01F 3/04794; B01F 3/04787; B01F 3/04808; B01F 3/04099; B65D 85/50; B65D 85/804; B65D 75/58
USPC ............ 99/323.1, 323, 295; 426/77, 78, 115
See application file for complete search history.

(56) References Cited

U.S. PATENT DOCUMENTS

| | | | | |
|---|---|---|---|---|
| 2005/0022674 A1* | 2/2005 | Campbell | ............... | A47J 31/52 99/275 |
| 2009/0104336 A1* | 4/2009 | Fraij | ................... | A47J 31/4485 426/590 |
| 2015/0284179 A1* | 10/2015 | Kohli | ................. | B65D 85/8043 426/115 |
| 2018/0201435 A1* | 7/2018 | Baenninger | ........ | B65D 85/8043 |

FOREIGN PATENT DOCUMENTS

| | | |
|---|---|---|
| WO | 2014125123 A1 | 8/2014 |
| WO | 2015132320 A1 | 9/2015 |

OTHER PUBLICATIONS

Written Opinion of the International Searching Authority, dated Mar. 17, 2017, in PCT/EP2017/050247, filed Jan. 6, 2017.

* cited by examiner

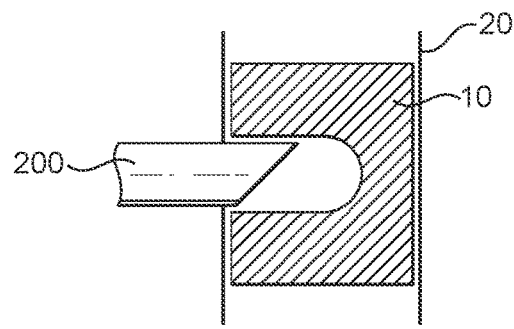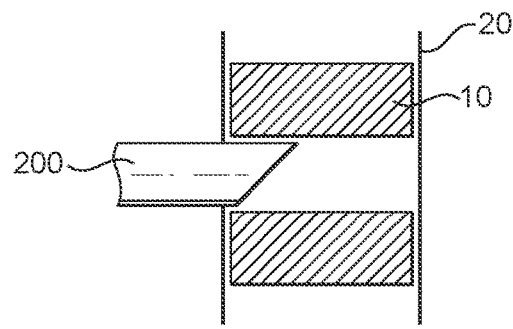
FIG. 6a  FIG. 6b
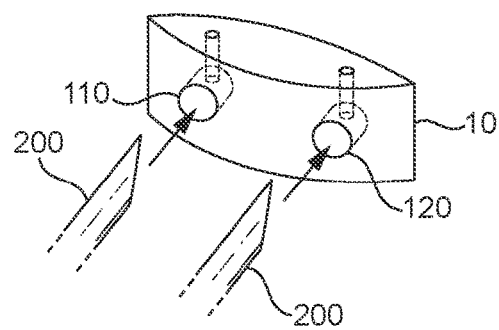
FIG. 7a
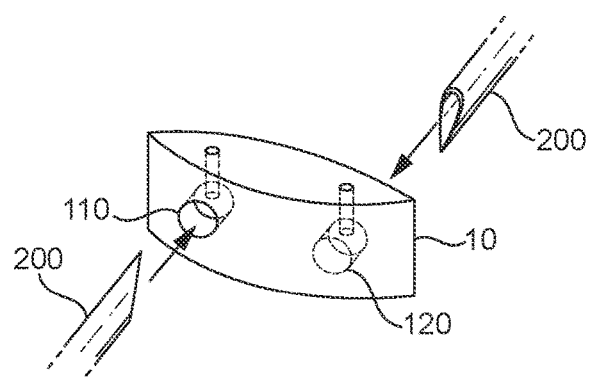
FIG. 7b

PACK FOR PREPARING FOOD OR BEVERAGE PRODUCTS

CROSS-REFERENCE TO RELATED APPLICATIONS/INCORPORATION BY REFERENCE STATEMENT

This application is a US national stage application filed under 35 USC § 371 of International Application No. PCT/EP2017/050247, filed Jan. 6, 2017; which claims priority to EP App No. 16151722.2, filed Jan. 18, 2016. The entire contents of the above-referenced patent applications are hereby expressly incorporated herein by reference.

TECHNICAL FIELD

The present disclosure relates to a pack for preparing food or beverage products, in particular to a pack comprising an insert and a container, such that a fluid is introduced in the container through the insert in order to prepare the corresponding food or beverage product.

BACKGROUND

Preparing beverages by introducing a capsule containing a food or beverage ingredient, such as ground coffee or instant coffee, in a beverage dispensing machine and injecting water into the capsule is known in the state of the art: the beverage or food ingredient is typically extracted or dissolved into water to form the beverage or the desired final product, which flows out of the capsule through a suitable outlet.

As such, different capsules have been developed in the past, these capsules being at least differentiated by the nature of the capsule body used for storing the food or the beverage ingredient. Whereas most of the capsules are made of a rigid body or semi-rigid body, typically made though injection moulding or thermoforming, flexible types of packs can be made out of foil materials. Flexible packs have generally the advantage to semi-rigid and rigid capsules that less amount of material is used to pack the product leading to overall less production cost, to lower life cycle impact shown in several life-cycle assessments and to advantages on the part of the user, who will need less available space for storing these packs, as they are more compact.

For example, WO 99/05044 describes a flexible beverage-producing sachet comprising a beverage ingredient in a volume formed by bonding two laminates at their edges, having a base seam into which a conduit of rigid plastics is bonded. An inlet nozzle is provided at the top of the resulting sachet for introducing water that is mixed with the beverage or food ingredient inside the inner volume of the sachet, the beverage produced being then evacuated through a beverage outlet arranged at the bottom of the pack, where closing means are provided, such that the closing means are adapted to open under pressure when pressurized water is introduced into the sachet, allowing the beverage to evacuate through the beverage outlet. However, this configuration presents important drawbacks for the consumer: the opening of the closing means is obtained by increase of pressure inside the sachet. Yet this pressure increase is not recommended for the preparation of some beverages because it creates bubbles at the surface of the beverage, for example this would not be desired for the preparation of tea. Besides, there exists the risk for the user that the packages may not rupture at the desired pressure, and that they would finally open up in an uncontrollable explosion. For this reason the apparatus where the sachet is processed needs to comprise means for totally enclosing the sachet in the machine during beverage preparation in order to avoid damages for the consumer.

Another drawback of these known sachets is that the inlet nozzle introduces water in the pack always according to the same vertical top-down orientation in the sachet. Therefore, all the beverages are produced according to the same process inside the sachet. Yet depending on the nature of the beverage ingredient and the desired beverage, the beverage ingredient should be processed differently.

It is also known from the state of the art, for example as per WO 2011/024103, a flexible pouch or sachet for preparing a beverage such as coffee, comprising a space where a concentrated dose of the product is stored. The pouch comprises also a rigid part on one of the sides of the pouch, provided with an inlet through which water is inserted into the pouch, a tube element conveying the water towards the opposite part of the pouch, so that the mixing of the water and the ingredient is made, and an outlet through which the product is dispensed. During the preparation of the beverage the beverage outlet is positioned at the top of the pouch. Water is introduced through the inlet and through the tube element until it fills the pouch and overflows through the beverage outlet positioned at the top of the pouch too. Such a pouch is conceived for preparing a beverage by extraction of roast and ground coffee but not by dissolution of instant coffee or other soluble materials. For this reason the pouch comprises a filter at the outlet to prevent insoluble particles from being dispensed with the beverage. An inconvenient of such a pouch is that at the end of the preparation of the beverage and the introduction of water, beverage remains in the pouch which is an issue for the user who cannot properly remove the pouch from the beverage production machine. Besides, in this pouch, neither the water inlet nor the beverage outlet are closed by a membrane, which is not recommended in terms of hygiene and shelf life as it could present problems to the consumer. Moreover, all the products are processed in the same way, so no optimization of the product dispensed according to the ingredients provided is possible with this system.

Besides, in these known systems, the correct and complete dissolution of the product inside is not achieved in many cases, and some product can be remaining inside the sachet at the end of the preparation process. Moreover, the flow time required is usually high, which represents a strong disadvantage for the consumer. Another disadvantage of these known systems is that they do not allow the production of a proper foam in case this should be desired for certain beverages or food products prepared.

The present disclosure comes to provide a solution to the above-described needs, as it will be further explained. The present disclosure also aims at other objects and particularly at the solution of other problems as will appear in the rest of the present description.

BRIEF DESCRIPTION OF THE DRAWINGS

Further features, advantages, and objects of the present disclosure will become apparent for a skilled person when reading the following detailed description of non-limiting embodiments of the present disclosure, when taken in conjunction with the appended drawings, in which:

FIGS. 6a-b show two different options for the inlets in the insert of the pack according to the present disclosure, either configured as a blind inlet or as a through inlet, respectively.

FIGS. 7a-b show schematically the possibilities of connecting the injecting needles with an insert comprising two inlets symmetrically arranged with respect to a food or beverage preparation machine where the pack is introduced, as represented in FIG. 5a.

DETAILED DESCRIPTION

Figure 1:
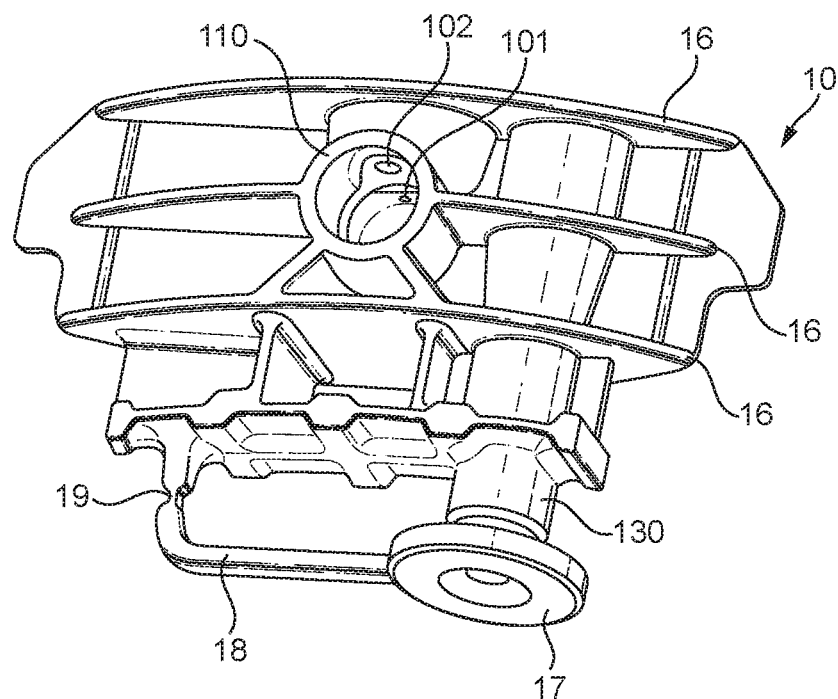
FIG. 1 shows a schematic view of an insert used in a pack for preparing food or beverage products according to a possible embodiment of the present disclosure.
Figure 2:
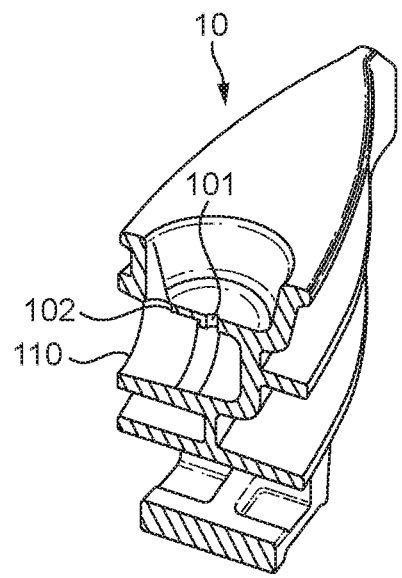
FIG. 2 shows a cut view of the insert used in a pack for preparing food or beverage products according to a possible embodiment of the present disclosure, shown in FIG. 1.

The present disclosure relates to a pack for preparing a food or beverage product from one or more ingredients comprising an insert and a container where the ingredient or ingredients are stored. The insert comprises at least one primary fluid inlet which comprises at least an aqueous fluid injection inlet and at least a gaseous fluid injection inlet, both inlets communicating with the inner volume of the container, and through which an aqueous fluid and a gaseous fluid can respectively be introduced inside the container in order to prepare the food or beverage product.

In certain non-limiting embodiments, the primary fluid inlet in the pack forms with the aqueous fluid injection inlet and with the gaseous fluid injection inlet an angle of approximately 90°.

In the pack of the present disclosure, the injection of gas and of aqueous fluid is typically done at close points inside the container.

In certain non-limiting embodiments, the fluid inlet can be accessed frontally or through its opposed rear part. In the pack of the present disclosure, the primary fluid inlet and the secondary fluid inlet are arranged within the insert in such a way that the turbulence created inside the container is optimal. According to a possible embodiment, the primary fluid inlet and the secondary fluid inlet are arranged symmetrically with respect to a central axis dividing the pack in two identical parts. According to a different embodiment, the primary fluid inlet and the secondary fluid inlet are arranged in the insert asymmetrically, creating optimal turbulences inside the container.

Typically, the insert in the pack of the present disclosure further comprises sealing means sealing the connection between the pack and injecting means injecting a gaseous and/or an aqueous fluid in the pack.

In certain non-limiting embodiments, the insert is arranged in the pack such that it allows the introduction of fluid in an upward direction inside the volume of the container.

In certain non-limiting embodiments, the insert in the pack of the present disclosure also comprises a dispensing outlet configured so that it delivers the food or beverage product prepared as a free flow by gravity fall. Also in certain non-limiting embodiments, the insert comprises a plug closing the dispensing outlet on one of its ends, the plug being joined to the insert by a bond.

The pack of the present disclosure is typically provided with identification means with the information on the fluid parameters introduced inside the container.

According to another aspect, the present disclosure refers to a machine for preparing a food or beverage product from a pack as previously described, comprising injecting means comprising an aqueous fluid channel and a gaseous fluid channel able to inject simultaneously or not the aqueous and/or the gaseous fluid.

In certain non-limiting embodiments, in the machine of the present disclosure, the aqueous fluid channel and the gaseous fluid channel are managed independently.

Also in certain non-limiting embodiments, the aqueous fluid channel and the gaseous fluid channel are managed independently regarding pressure and/or temperature and/or fluid flow.

According to another aspect, the present disclosure relates to a system for preparing a food or beverage product comprising a pack as the one described and a machine also as previously described.

According to another aspect, the present disclosure relates to the use of a pack as disclosed for preparing a food or beverage product.

Still according to another aspect, the present disclosure refers to a method for preparing a food or beverage product from one or more ingredients comprised in a pack, the method comprising: injecting an aqueous fluid at a certain pressure into the inner volume of the pack; injecting at certain pulses of time a gaseous fluid simultaneously with the aqueous fluid.

In certain non-limiting embodiments, in the method of the present disclosure, the injection pressure of the aqueous fluid and of the gaseous fluid are different.

In certain particular (but non-limiting) embodiments, in this method according to the present disclosure, the pressure and/or temperature and/or flow of the aqueous and gaseous fluid injection depend on the type of ingredient or ingredients in the pack.

According to a first aspect, the present disclosure relates to an insert 10 for being used with a food or beverage container 20, both configuring a pack 100 for preparing a food or a beverage product. The container 20 comprises at least one ingredient for the preparation of a beverage or food product, typically by dissolution with at least one fluid injected through the insert 10.

According to the present disclosure the food or beverage ingredient of the container can be comprised within the list of: soups, fruit juices, vegetable juices, bouillons, coffee, chocolate, tea, milk or creamer, smoothies, purees, coulis, creams or a combination thereof. The food or beverage ingredient can be a soluble food or beverage ingredient. In certain non-limiting embodiments, the food or beverage ingredient is a soluble food or beverage ingredient selected in the list of:

instant coffee powder, milk powder, cream powder, instant tea powder, cocoa powder, soup powder, fruit powder or mixture of said powders, a coffee concentrate, a milk concentrate, a syrup, a fruit or vegetable concentrate, a tea concentrate, a fruit or vegetable puree.

The powders can be agglomerated or sintered. The powders or liquid concentrates can be mixed with solid pieces for example for preparing soups with solid or encapsulated pieces. The food or beverage ingredient can also be an infusable food or beverage ingredient like a roast and ground coffee or tea leaves. In that embodiment water extracts the infusable ingredient.

In the present disclosure, fluid covers either any aqueous diluent that can be mixed with a soluble beverage ingredient to prepare a beverage, like water, carbonated water, milk, etc. (in certain non-limiting embodiments, water is the exemplary aqueous diluent) or any gaseous fluid such as for example air. When referring to aqueous fluid, in certain non-limiting embodiments, water is the exemplary fluid; when referring to gaseous fluid, in certain non-limiting embodiments, air is the exemplary fluid.

The pack of the present disclosure can be configured having any possible shape, such as a pouch (flexible, for example), a capsule, or any other possible container shape.

As represented in FIG. 1, the insert 10 comprises at least a primary fluid inlet 110 typically having a frontal access 110' and a rear access 110" so the pack 100 can be pierced independently on how it is inserted (when having only one primary fluid inlet 110, this will be typically arranged in the center of the insert so as to allow reversible piercing; otherwise, when two inlets are provided, 110 and 120, these can be pierced frontally or through the rear part, in 110' and, when turning the pack, in 120"; or in 120' and, when turning the pack, in 110", all these understanding that the piercing and injecting means in the machine are always arranged in the same positioning). The primary fluid inlet 110 comprises an aqueous fluid injection inlet 101 and a gaseous fluid injection inlet 102, both communicated with the inner volume of the container 20, through which an aqueous fluid (typically water) and a gaseous fluid (typically air) are respectively injected inside the container 20.

Figure 3:
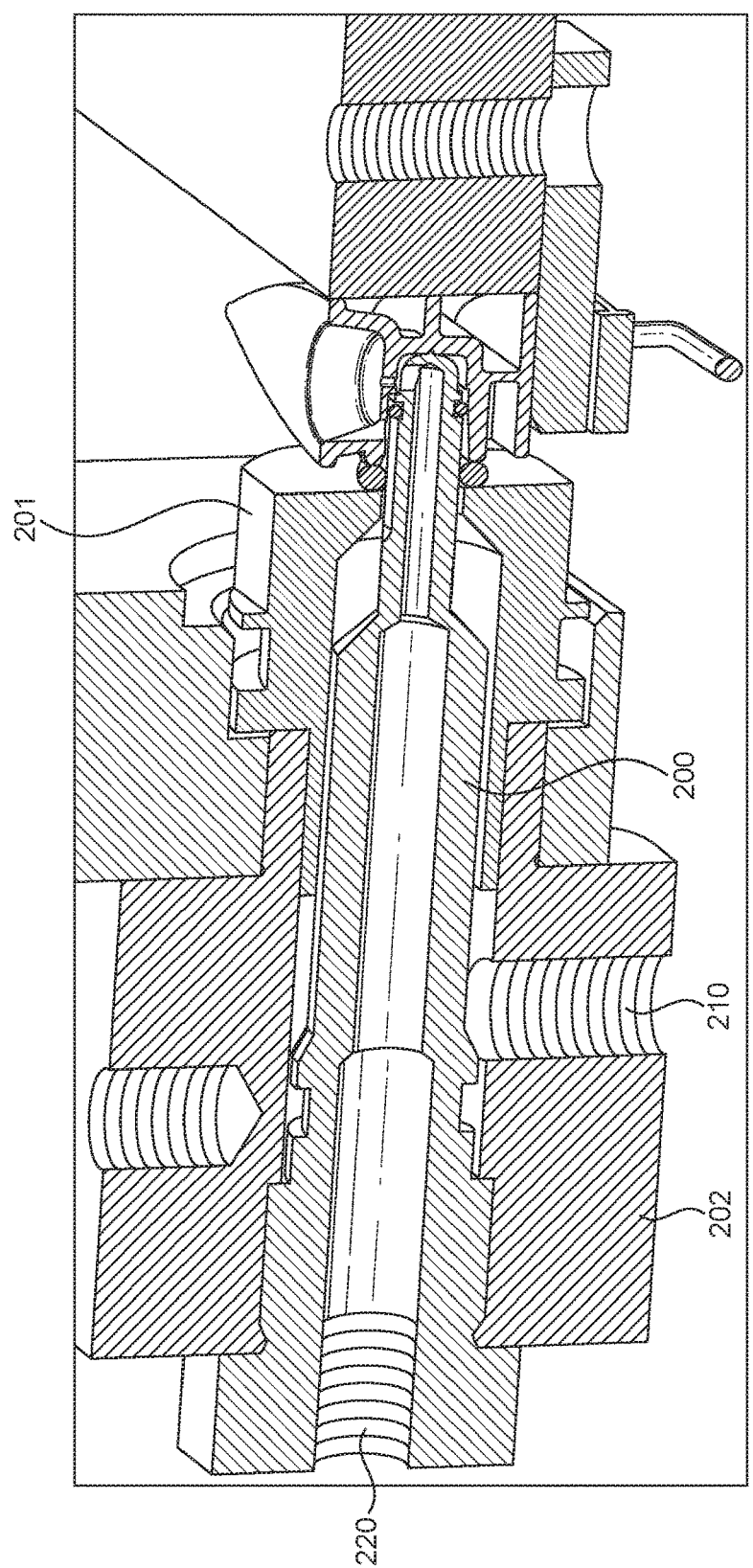
FIG. 3 shows a cut view of the insert in any of FIG. 1 or 2, where a needle injecting at least a fluid through the insert is also represented.

Using an insert 10 as shown in FIG. 1 connected to a container 20 configuring a pack 100 would be made in such a way that injecting means 200, typically a needle, would pierce the film of the primary fluid inlet 110: typically, these injecting means 200 are configured as shown in FIG. 3 such that they can inject both an aqueous fluid (typically water) and a gaseous fluid (typically air) also simultaneously. Therefore, air will be introduced inside the volume of the container 20 through a gaseous fluid injection inlet 102 and water will be introduced through an aqueous fluid injection inlet 101. With such a configuration, both air and water will be injected substantially at the same point inside the container 20: this will help to obtain a much better dissolution of the food or beverage ingredient in the container (typically, by injecting air, turbulence inside the container 20 is enhanced helping the aqueous fluid to reach the top part of the container and to dissolve the most of the content inside of it). Another benefit of adding air during the dissolution is to enhance the production of foam or crema in the final beverage delivered. Moreover, adding air also allows inflation of the pouch or container in order to optimize the water turbulences in the inner volume that help improving the dissolution. According to the present disclosure, in certain non-limiting embodiments, the aqueous and gaseous fluids are each managed independently: this allows injecting only air at the end of the preparation process in the container so that purging the pouch with air pressure reduces the flow time and helps emptying the content in the pouch at the end. Managing independently the aqueous fluid (water) and the gaseous fluid (air) injected can be done by distinct gaseous fluid injection inlet 102 and aqueous fluid injection inlet 101. Moreover, the injecting means 200 also typically comprise separated water and air channels, as it will be further explained in detail.

Tests made using a sample pack of 100×140 mm size to deliver a beverage product into a cup of 158 ml without injecting air give as a result a flow time of 50 seconds, height of foam provided of 24 mm and 10 gr of residual product remaining inside the container 20. Water is injected at a temperature of 25° C. Similar test has been run injecting also air at a pressure of around 0.2 bars together with water, resulting in a reduced flow time of 42 seconds, with only 1 gr of remaining product in the container and a height of foam of 28 mm.

Referring now to attached FIG. 3, exemplary (but non-limiting) injecting means 200 to be used with a pack 100 according to the present disclosure are represented: the injecting means 200 pierce the primary fluid inlet 110 (frontally, as represented in FIG. 3) of the insert 10. The injecting means comprise separated air 210 and water 220 channels, such that air and water are independently introduced in the container 20, respectively. Surrounding the air and water channels there is a needle sleeve 201 provided and a needle support 202 makes the sustenance for the injecting means 200.

As each fluid is managed and introduced independently, it can also be injected at a different pressure inside the container. Also, by using the same injecting means, multiple fluids can be injected using the same available channels 210, 220.

Figure 4:
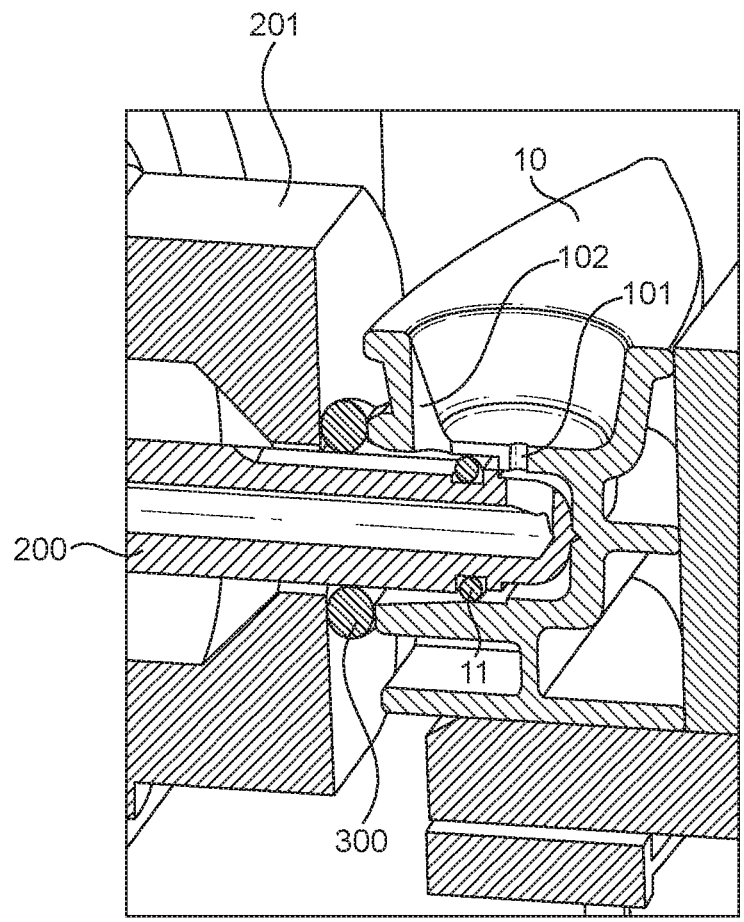
FIG. 4 shows a detailed view of the insert and injecting needle, as represented in FIG. 3.

A further detailed cut view of the injecting means 200 and its connection to the insert 10 is represented in FIG. 4. The injecting means 200 are typically part of a machine to which the pack 100 is connected: the pack and the machine (injecting means) are sealed by elastomeric means 300, typically an elastomeric O-ring. Another possibility (not shown in the Figures) would be to add lips in the insert 10, the lips being made in a flexible or deformable material, allowing correct tightness in the connection. Also, the injecting means 200 can be made of a shape (for example, conical) complementary to the shape in the insert part receiving them, so as to allow a proper and tight connection. in certain non-limiting embodiments, the insert 10 further comprises sealing means 11 sealing the connection of the injecting means 200 with the insert 10, namely sealing the connection of the air and water channels 210, 220 respectively.

In contrast with the systems in the known prior art, where the fluid is introduced from top to bottom, the pack of the present disclosure works by injecting water and, in certain non-limiting embodiments, air from bottom to top at high velocity, which allows optimal turbulences created inside the container and therefore optimal dissolution of the product inside. The air through the injecting means 200 is not introduced at high pressure: in certain non-limiting embodiments, the pressure is comprised between 0.1 and 1.5 bar, such as (but not limited to) between 0.3 and 0.5 bar. According to the present disclosure, optimal turbulences and dissolution are obtained by high velocity, not by high pressure.

In certain non-limiting embodiments, the aqueous fluid (water) is injected at a pressure higher than 2 bar, such as (but not limited to) higher than 3 bar, or is comprised between 2 and 10 bar, such as (but not limited to) around 7 bar. The fluid inlet 110 or fluid inlets 110, 120 are configured in such a way that the high pressure fluid injected through them by the injecting means 200 is converted into a high velocity jet, which is driven into the container 20. Typically, the diameter of the fluid inlets is comprised between 1 mm and 4 mm, such as (but not limited to) between 1.5 mm and 3 mm and comprises a yieldably cover over it which can be pierced by the injecting means 200. The aqueous fluid injection inlet 101 of the fluid inlet communicating with the inside volume of the container has a diameter of at most 1 mm, such as (but not limited to) of at least 0.2 mm, or comprised between 0.2 mm and 1 mm, such as (but not limited to) between 0.3 and 0.6 mm. With such a configuration, the high pressure fluid injected by the injecting means 200 is conveyed internally towards the aqueous fluid injection inlet, from which it is converted into a high velocity jet of fluid injected inside the container. Typically, this jet of fluid provided in the container has a velocity of at least about 20 m/s, such as (but not limited to) of at least 30 m/s.

The fluid jet which is created inside the container avoids that the food or beverage product flows through the dispensing outlet too rapidly: therefore, the time of agitation of the ingredient together with the fluid inside the container volume is increased.

According to the present disclosure, the fluid inlets can also be configured for providing an orientable high velocity jet into the containers, such as (but not limited to) at about 90° with respect to the fluid supply provided into the fluid inlets by the injecting means, though any other angle would be possible and comprised within the scope of the present application.

As described, the fluid inlets in the insert 10 are configured for introducing the fluid under the form of a jet in the inner volume of the container. By jet it is understood a stream of liquid or fluid into the inner volume of the container quickly and with force. Such a configuration is obtained, in certain non-limiting embodiments, by placing a constriction (that of the aqueous fluid injection inlet) in the fluid path in the fluid inlet to reduce the size of the section of the fluid inlet. Due to the small surface of the injection hole through which the fluid goes into the inner volume of the container, the pressurized fluid creates a jet in the inner volume of the container.

The small surface of the injection inlet presents the advantage of avoiding any back flow of fluid from the inner volume of the container into the fluid inlet. For the same fluid to be provided through the fluid inlet, the surface of the injection inlet can vary according to the nature of the food and beverage ingredient inside the container which is to be mixed with the fluid. In particular when the ingredient is difficult to dissolve a smaller injection inlet creates a jet with a higher velocity which improves agitation and dissolution of this ingredient in the container.

Figure 5A:
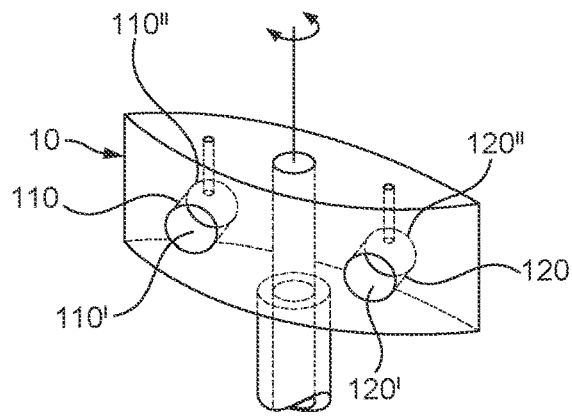
FIGS. 5a-c show schematic views of an insert and of a pack comprising said insert, according to another embodiment of the present disclosure, where the insert comprises two inlets symmetrically arranged with respect to a food or beverage preparation machine where the pack is introduced.
Figure 5B:
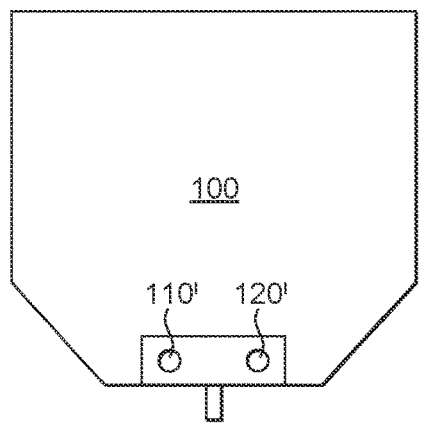
Figure 5C:
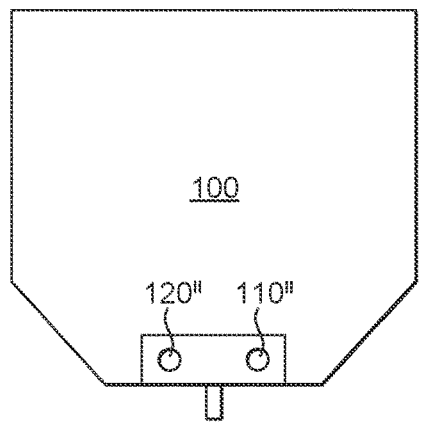

The insert 10 comprises at least one primary fluid inlet 110, though it can also comprise one primary fluid inlet 110 and one secondary fluid inlet 120, as shown in FIG. 5a. Further, in order to allow symmetrical introduction of the pack with such an insert in a machine, without requiring any orientation or specific placement of the pack by the consumer, both the primary and the secondary fluid inlets 110, 120 can be accessed and pierced frontally or by the rear part as shown in FIGS. 5b and 5c, respectively. Therefore, the primary fluid inlet 110 comprises a frontal access 110' and a rear access 110" and, similarly, the secondary fluid inlet 120 also comprises a frontal access 120' and a rear access 120".

In certain non-limiting embodiments, the insert 10 is identical on both its front and rear parts.

When having two fluid inlets 110, 120, water can be introduced for example through one of them and air can be introduced through the other one. Also, both water fluid can be introduced through the two inlets or both water and air can be introduced through the two inlets at the same time: any combination is therefore possible. The arrangement of the fluid inlets in the insert 10 is made such that the turbulence created in the inner volume of the container is optimal. It has also been found that, when the fluid inlets are not arranged symmetrically in the insert 10, the turbulences created are better and allow even a better dissolution of the ingredient inside, reducing dead zones inside the volume, allowing less preparation time and providing better foaming.

Figure 8:
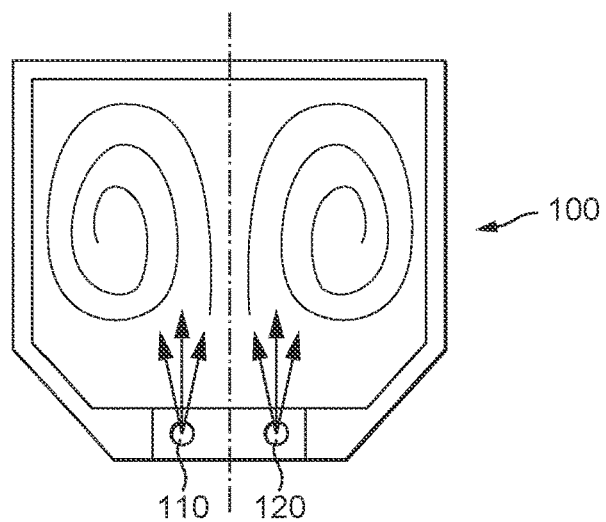
FIG. 8 shows schematically the turbulences created for example in a pack comprising an insert as the one represented in FIG. 5a, when two jets are injected at the same time from two injecting needles.

FIG. 8 shows two symmetrical fluid inlets 110, 120 through which water and/or air are introduced inside the container 20 in order to set up a defined vortex pattern to enhance dissolution of the ingredient inside. This dual vortex pattern created allows optimal dissolution and enhances turbulences. As described, the fluid inlets can be arranged symmetrically or not within the insert 10. Different possibilities are allowed, according to the present disclosure, one of the injecting means 200 can for example inject one fluid (water) and the second injecting means can inject two fluids (water and air) at the same time, or any other possibility is allowed.

FIGS. 6a and 6b show two possible embodiments of the fluid inlets in the insert 10 of the present disclosure: It can be made as a blind hole (as represented in FIG. 6a) or as a through hole (as represented in FIG. 6b).

FIGS. 7a and 7b show different possibilities of introducing the injecting means 200 in the insert 10: FIG. 7a represents the possibility of two needles piercing frontally the two fluid inlets 110 and 120. FIG. 7b represents the possibility of two needles piercing the primary fluid inlet 110 frontally and the secondary fluid inlet 120 in the rear part.

The insert 10 comprises a dispensing outlet 130, through which the beverage or final product is dispensed, as shown in FIG. 1. In certain non-limiting embodiments, the dispensing outlet 130 is configured so that it delivers the product as a free flow, meaning that the product can flow from the dispensing outlet 130 by simple gravity fall. According to a particular (but non-limiting) embodiment of the present disclosure, the dispensing outlet 130 comprises an opening at the bottom of the insert 10, having a transverse section with a surface area equivalent to the surface of a circular surface of diameter of at least 1 mm, such as (but not limited to) at most 6 mm, or comprised between 1.5 and 3 mm. The dispensing outlet 130 is typically configured as a straight tube oriented essentially vertically in the insert 10, comprising at its end an opening. In certain non-limiting embodiments, the length of the tube is of at least 5 mm. Such a length generally enables a finalisation of the froth of the product, typically a beverage, before it is delivered in a drinking cup. An advantage of the dispensing outlet 130 of the present disclosure is that there is no need to implement a particular connection with the machine when a beverage is for example produced, in order to direct the flow of the beverage delivered at the dispensing outlet 130: the beverage can flow from the dispensing outlet 130 directly into a drinking cup.

According to the present disclosure, before the food or beverage preparation step, the dispensing outlet 130 (there can also be more than one in the insert 10) is closed at its end. Generally the dispensing outlet is closed by manufacturing and is configured for being opened at food or beverage production step. By "closed by manufacturing" it is meant that a complete pack, comprising the container and the insert 10, is manufactured with a closed dispensing outlet 13. This closure guarantees hygienic and shelf life protection. The dispensing outlet 130 can be opened by a machine or manually.

In certain non-limiting embodiments, the dispensing outlet 130 is closed by a plug 17, as represented schematically in FIG. 1, said plug 17 comprising means for maintaining it attached to the insert 10 after the opening of the dispensing outlet 130. Consequently the plug 17 does not fall in the beverage or food during its production. The means for maintaining the plug 17 attached to the insert 10 can be a plastic bond 18 attached to the insert 10, for example, or any other suitable means providing a similar effect. Moreover, the dispensing outlet 130 can also comprise a weakened area 19 near the plug 17: this weakened area can be made for example as a narrowing of the dispensing outlet tube so that it is easier to cut or tear off the plug 17 by the machine. This is shown for example in FIG. 1.

In certain non-limiting embodiments, the plug 17 is part of one insert 10 comprising the dispensing outlet and the fluid inlet. In particular when the insert 10 is made by injection moulding, the design of the mould also comprises the plug 17. In the same manner the plastic bond 18 can also be part of the design of the insert 10 when it is made by injection moulding, which again provides advantages from a manufacturing point of view, as the same part comprises the fluid inlet, the plug 17 and the bond 18.

In certain non-limiting embodiments, the insert 10 is rigid and is made of a rigid plastic material, such as (but not limited to) by injection moulding. Typically, this plastic material can be selected from the following: polypropylene, polyethylene, polyethylene terephthalate and polylactic acid. Also according to another particular (but non-limiting) embodiment, the insert 10 can be made of a metal like aluminium or tin-plate.

Different sizes of the pack 100 can be used in a same machine adapted to store different quantities of ingredients: typically, it is the configuration of the insert 10 as to external shape and piercing requirements of the fluid inlets what determines the machine to use; however, the size of the containers, when extending vertically, does not determine or limit the machine. As a consequence, it becomes possible to produce different products, such as for example a cup of espresso coffee or a bowl of soup, with the same machine. The external design and configuration of the insert 10 will remain unchanged independently on the product targeted; however, the internal design of the insert 10, in particular as to the diameter of the injection inlet will differ as a function of the ingredient to be processed and therefore as a function of the food or beverage product targeted. Also, other parameters such as the flow rate of fluid injected and/or the temperature of the fluid injected and/or the total volume of fluid injected, will be modified as a function of the ingredient to be processed and therefore as a function of the food or beverage product targeted.

In certain non-limiting embodiments, the container 20 configuring the pack 100 comprises two flexible water impermeable sheets joined to one another to define an inner volume where at least one ingredient for the preparation of a single or multiple product is stored. In certain non-limiting embodiments, the food or beverage container 20 presents an essentially plane shape, wherein the insert 10 is arranged on one of the sides of the pack 100. In certain non-limiting embodiments, the pack itself is substantially flexible and looks like a pouch or sachet. By flexible, it is meant that the sheets can be bent easily. The resulting pack 100 can be bent also, as being soft and can be deformed contrary to rigid containers. The flexible sheet material can be plastic laminates, metallised foil or alufoil or fibre base material. According to the present disclosure, the two flexible water impermeable sheets can be formed of one single flexible water impermeable sheet folded in half and joined at its free edges.

The pack 100 can also comprise an excrescence enabling the handling of the pack by the user or consumer: this has not been shown in the Figures attached, though.

Typically, the two flexible water impermeable sheets joined to one another to define the inner volume of the container are formed of one single flexible water impermeable sheet folded in half and joined at its free edges. According to said mode the container is a plane pouch made of a flexible material sheet, said sheet being folded at the top of the container and bonded on its edges to define the inner volume, the bottom bonded edge typically including the insert 10. This embodiment constitutes a particularly easy way to manufacture the pack 100 since it requires the cutting of only one piece of sheet—such as (but not limited to) according to a rectangular shape—and its folding to create the inner volume for the food or beverage ingredient. Typically, also for manufacturing convenience, the insert 10 is introduced in the bottom edge of the container during the sealing of its edges.

The fluid inlets are typically enclosed in the complete pack 100 by the sheet(s) of material defining the inner volume of the container: the yieldable cover over the fluid inlets piercable by the injecting means 200 is therefore made by the sheets of material covering these fluid inlets, so it is not necessary to prepare any supplementary cover or membrane to go over them, so the manufacturing is easy and convenient. Consequently the same piece of material can be used to simultaneously create the inner volume of the container and to close the fluid inlets. As such, the present disclosure provides a pack 100 that is easy to manufacture and which guarantees hygienic and shelf life protection of the food and beverage ingredients and of the produced food or beverage product.

In certain non-limiting embodiments, the introduction of the insert 10 in the bottom edge of the container during the sealing of its edges to configure the complete pack 100 makes it possible that the flexible sheet can cover the part of the insert 10 including the fluid inlet. Consequently during the single step of bonding the edges of the sheet, it is possible to simultaneously create the inner volume for storing the food or beverage ingredient, place the insert 10 and close the fluid inlet. In certain non-limiting embodiments, the dispensing outlet 130 is not covered by the sheet. Yet it can be visually hidden by a part of the sheet e.g. by a skirt of the sheet. Also in certain non-limiting embodiments, according to the present disclosure, the insert 10 comprises ribs 16 arranged in at least one of the external surfaces of the insert 10 for improving the adhesion of the insert with the flexible material sheet during sealing. In particular a raising edge can surround the fluid inlet so as to improve air and water tightness around it.

According to certain non-limiting embodiments of the present disclosure, either the insert 10 and/or the container 20 comprise identification means with the information for the aqueous and/or gaseous fluid supplied in the inner volume of the container 20 from the fluid inlets. Such identification means can comprise any kind of recognition means such as, for example, mechanical codes, optical codes, RFID tags, bar codes, magnetic codes, detection holes or the like.

The identification means also comprise the information on process parameters to produce the food or beverage product. The process parameters are at least one or a combination of the following: temperature of the aqueous fluid injected, pressure of the gaseous fluid injected, total volume of gas and water injected, processing time, etc.

In certain non-limiting embodiments, the pack 100 of the present disclosure presents a plane shape oriented along a plane essentially vertically oriented during beverage production and the fluid inlet orientates the jet of aqueous and/or gaseous fluid in a direction comprised in said plane. The fluid jets introduced from the bottom into the container develop into circular and spiral movements creating turbulences, frictions and high contact surfaces between the fluid molecules and the ingredient particles (see FIG. 8). In average the fluid molecules have several turns within the container until they leave it together with the beverage or food product once mixed. Best dissolution results have been observed with a pack of rectangular shape.

According to the present disclosure, the container is arranged essentially vertically during the production and dispensing of the food or beverage product, and the insert is arranged in such a way that the water and/or air coming through the fluid inlet or inlets is supplied into the container in an upward direction.

According to the present disclosure, the aqueous fluid can be supplied into the container 20 at any temperature, cold, ambient or hot, depending on the type of food or beverage product targeted.

According to a second aspect, the present disclosure refers to a method for preparing a food or beverage product using a pack 100 as previously described. The main goal of the method is to effect a proper dissolution of the product inside the pack, and this is achieved by creating strong turbulences that will well mix and dissolve the product before it is delivered. In certain non-limiting embodiments, pressurized water will be injected into the container 20 through the insert 10 from the beginning of the process. At certain times, defined pulses of air will, in certain non-limiting embodiments, be injected into the container, also through the insert 10, in order to help achieving the turbulence, hence the dissolution. These pulses of air will not last long, approximately from 1 to 5 seconds, such as (but not limited to) from 1.5 to 3 seconds. At the end of the process, before the final stop of injection of pressurized water, a further pulse of air will also be injected in order to help proper emptying of the content of the pack, also helping speeding up the emptying of the pack at the end of the process. Depending on the type of product to be prepared in the pack, the injection of such pulses of air can be varied, in frequency and/or in length.

Thanks to the configuration of the insert 10 of the present disclosure, it is possible to effect injection of water through one primary inlet 110 for example, and injection of air at certain times through the secondary fluid inlet 120, for example. It is also possible to effect the injection of both, water and air at certain times, through only one inlet 110, through injection means 200 having a double channel and allowing this double injection. Any other possible configuration is possible according to the present disclosure, as for example injecting water both through primary and secondary inlets 110 and 120, and injecting air at certain times through both or one of these inlets. Any configuration is possible, as the insert 10 is configured to allow a plurality of injections of different fluids.

According to the present disclosure, the fluids injected through the injecting means 200 are managed independently, as already explained previously, as there are separated channels in these means 200 allowing independent flow of each one of them. This allows injecting the aqueous fluid (typically, water) and the gaseous fluid (typically, air) at different pressures for example, also at different temperatures or flow values. The management of the fluids independently is very important to control good dissolution values and to obtain high quality end products. Typically, the aqueous fluid is injected at a high pressure and the pulses of air are injected at certain times and at a lower pressure to help dissolution and creation of turbulences, as explained, further helping avoiding any possible backflow in the machine for example.

Optimal turbulences help making a good dissolution, also improve foam creation and maintain under control the flow time of the product in cup.

According to yet another aspect, the present disclosure refers to a machine 50 cooperating with a pack 100 as described previously. The machine 50 comprises receiving means 51 adapted to accommodate the pack 100 such as (but not limited to) in such a way that the pack 100 is positioned vertically and the insert 10 is positioned at the bottom of the pack, and injecting means 200 (also being piercing means in certain non-limiting embodiments, typically configured as a needle) designed for engaging with the insert 10 and for injecting water and/or air through the one or more fluid inlets. Typically, as the pack 100 is processed to obtain the beverage or food product in an essentially vertical position in the machine 50, the pack will be introduced either frontally in the machine 50 or laterally.

Figure 9:
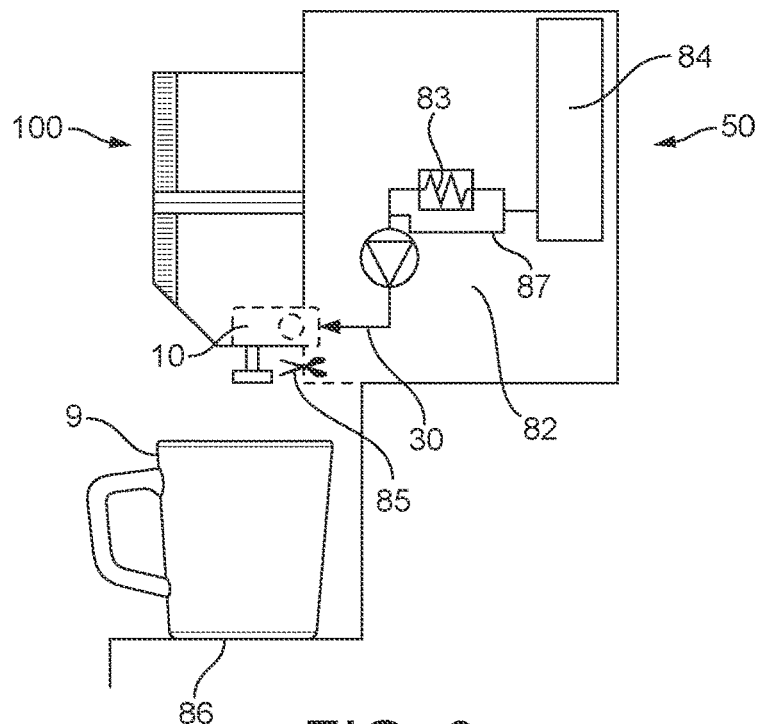
FIG. 9 shows schematically a food or beverage preparation machine cooperating with a pack according to the present disclosure.

According to the present disclosure and as schematically illustrated in FIG. 9, a machine 50 for preparing food or beverage products from a pack 100 as described previously comprises at least:
  a fluid supply or tank 84 and a pump 82 for supplying pressurized aqueous fluid (water) to the fluid inlet or inlets in the insert 10;
  a heater 83 for eventually heating the aqueous fluid;
  a bypass line 87 for delivering aqueous fluid at ambient temperature;
  a valve (not illustrated) for the selection of either hot or ambient aqueous fluid;
  optionally, a cooling unit (not shown) can also be provided in the machine 50 for delivering cold aqueous fluid;
  injecting means 200, and in certain non-limiting embodiments, piercing and injecting means, such as (but not limited to) one or a plurality of fluid needles, piercing the fluid inlet or inlets and injecting the pressurized aqueous fluid coming from the fluid supply and the gaseous fluid (air);
  a device for cutting or tearing the plug 17 from the dispensing outlet 13.

The machine 50 also comprises a data reader, comprising in certain non-limiting embodiments an optical device, which reads and retrieves the information from the identification means in the pack 100. When the identification means comprise detection holes, the data reader will retrieve the information from the identification means by a light emitter device emitting light passing through these punched holes.

In certain non-limiting embodiments, the machine further comprises a positioning area 86 for allocating a drinking cup 9 under the dispensing outlet of the pack when a food product or a beverage is prepared.

Further aspects of the present disclosure relate to a system comprising a pack 100 and a machine 50 cooperating in order to produce a food or beverage product and to the use of a pack 100 in the preparation of a food or beverage product, particularly using such a machine 50.

Although the present disclosure has been described with reference to particular (but non-limiting) embodiments thereof, many modifications and alternations may be made by a person having ordinary skill in the art without departing from the scope of this the present disclosure which is defined by the appended claims.

The invention claimed is:

1. A pack for preparing a food or beverage product from one or more ingredients, the pack comprising:
   an insert comprising at least one primary fluid inlet and a dispensing outlet, the at least one primary fluid inlet comprising at least an aqueous fluid injection inlet and at least a gaseous fluid injection inlet; and
   a container where the ingredient or ingredients are stored, wherein the aqueous fluid injection inlet and the gaseous fluid injection inlet communicate with the inner volume of the container; and
   wherein an aqueous fluid and a gaseous fluid can respectively be introduced inside the container through the aqueous fluid injection inlet and the gaseous fluid injection inlet in order to prepare the food or beverage product, and wherein the dispensing outlet of the insert is configured to deliver the prepared food or beverage product as a free flow by gravity fall.

2. The pack according to claim 1, wherein the primary fluid inlet forms with the aqueous fluid injection inlet and with the gaseous fluid injection inlet an angle of approximately 90°.

3. The pack according to claim 1, wherein the injection of gas and of aqueous fluid is done at close points inside the container.

4. The pack according to claim 1, wherein the fluid inlet can be accessed frontally or through its opposed rear part.

5. The pack according to claim 1, further comprising a primary fluid inlet and a secondary fluid inlet arranged within the insert in such a way that the turbulence created inside the container is optimal.

6. The pack according to claim 5, wherein the primary fluid inlet and the secondary fluid inlet are arranged symmetrically with respect to a central axis dividing the pack in two identical parts.

7. The pack according to claim 5, wherein the primary fluid inlet and the secondary fluid inlet are arranged in the insert asymmetrically, creating optimal turbulences inside the container.

8. The pack according to claim 1, wherein the insert further comprises sealing means sealing the connection between the pack and injecting means injecting a gaseous and/or an aqueous fluid in the pack.

9. The pack according to claim 1, wherein the insert is arranged in the pack such that it allows the introduction of fluid in an upward direction inside the volume of the container.

10. The pack according to claim 1, wherein the insert comprises a plug closing the dispensing outlet on one of its ends, the plug being joined to the insert by a bond.

11. The pack according to claim 1, further comprising identification means with the information on the fluid parameters introduced inside the container.

12. A machine for preparing a food or beverage product from a pack according to claim 1, the machine comprising:
   injecting means comprising an aqueous fluid channel and a gaseous fluid channel able to inject simultaneously or not the aqueous and/or the gaseous fluid.

13. The machine according to claim 12, wherein the aqueous fluid channel and the gaseous fluid channel are managed independently.

14. The machine according to claim 13, wherein the aqueous fluid channel and the gaseous fluid channel are managed independently regarding pressure and/or temperature and/or fluid flow.

15. Use of a pack according to claim 1 for preparing a food or beverage product.

16. A system for preparing a food or beverage product comprising:
   a pack comprising:
      an insert comprising at least one primary fluid inlet and a dispensing outlet, the at least one primary fluid inlet comprising at least an aqueous fluid injection inlet and at least a gaseous fluid injection inlet; and
      a container where the ingredient or ingredients are stored, wherein the aqueous fluid injection inlet and the gaseous fluid injection inlet communicate with the inner volume of the container; and
      wherein an aqueous fluid and a gaseous fluid can respectively be introduced inside the container through the aqueous fluid injection inlet and the gaseous fluid injection inlet in order to prepare the food or beverage product, and wherein the dispensing outlet of the insert is configured to deliver the prepared food or beverage product as a free flow by gravity fall; and
   a machine comprising injecting means comprising an aqueous fluid channel and a gaseous fluid channel able to inject simultaneously or not the aqueous and/or the gaseous fluid.

* * * * *